Feb. 24, 1953 — A. G. GOLDBERG — 2,629,109
BASSINET FOR AUTOMOBILES
Filed July 18, 1951 — 2 SHEETS—SHEET 1

INVENTOR.
Abraham G. Goldberg
BY Louis C. Smith
attorney.

Feb. 24, 1953 A. G. GOLDBERG 2,629,109
BASSINET FOR AUTOMOBILES
Filed July 18, 1951 2 SHEETS—SHEET 2
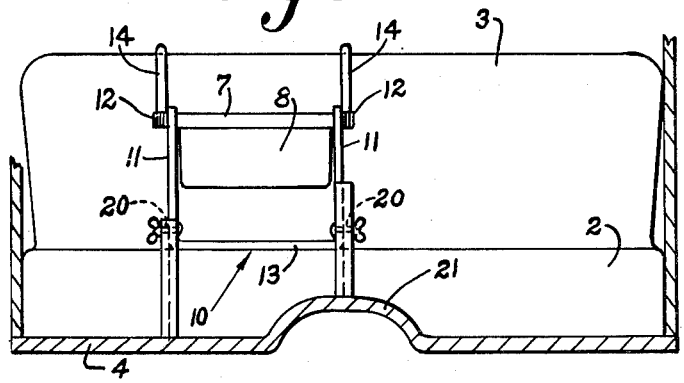
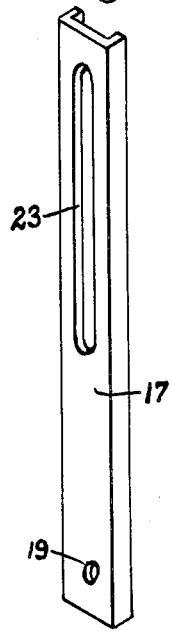
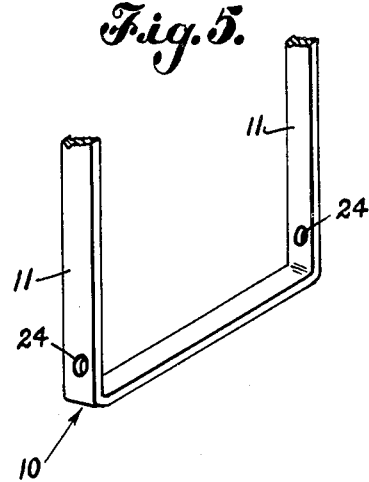
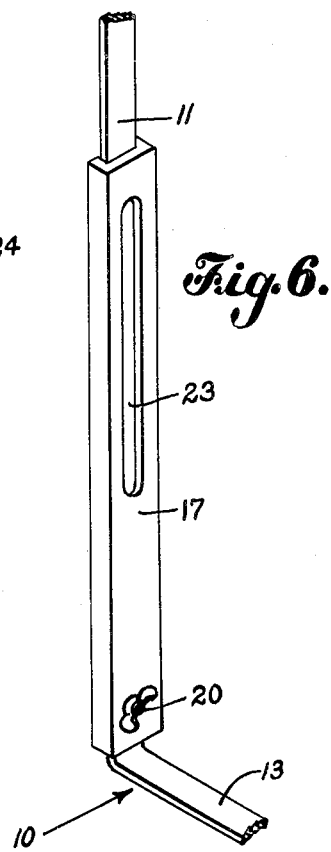
INVENTOR.
Abraham G. Goldberg.
BY Louis C. Smith
attorney.

Patented Feb. 24, 1953

2,629,109

UNITED STATES PATENT OFFICE 2,629,109

BASSINET FOR AUTOMOBILES

Abraham G. Goldberg, Chestnut Hill, Mass.

Application July 18, 1951, Serial No. 237,410

1 Claim. (Cl. 5—94)

This invention relates to a bassinet or child's crib for use in an automobile and it has for its general object to provide an improved bassinet adapted to be placed above the driver's seat and alongside of the driver so that if the driver is the only occupant of the automobile besides the child she will be able to watch the child without withdrawing her attention from the roadway.

In order to give an understanding of the invention, I have illustrated a selected embodiment thereof in the drawing which will now be described. The novel features of the invention will be pointed out in the appended claim.

In the drawings,

Fig. 3 is a section on the line 3—3, Fig. 1.

Fig. 4 is a perspective view of one of the extension legs.

Fig. 5 is a fragmentary perspective view of the lower end of one of the U-shaped supporting members.

Fig. 6 is a view showing the manner in which the extension legs may be stored when not being used.

Figure 1:
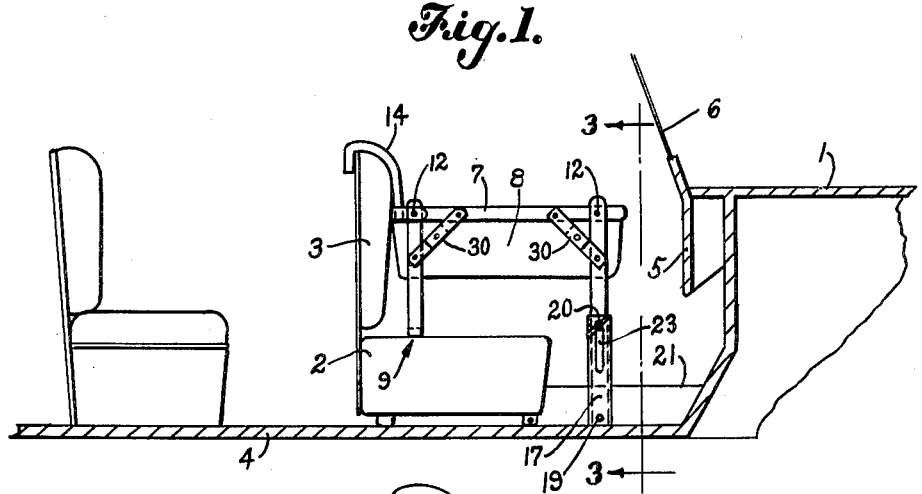
Fig. 1 is a more or less diagrammatic sectional view of an automobile having my improved bassinet installed therein.

In the drawing, 1 indicates generally an automobile having the front or driver's seat 2 provided with the usual back 3. 4 indicates the floor of the automobile, 5 indicates the cowl or instrument board, and 6 is a portion of the front windshield.

As stated above, my improved bassinet is designed to be installed in the automobile above the driver's seat 2 and along side of the driver.

The bassinet is made with an elongated rigid top frame member 7 and a body member 8 of canvas or some other suitable flexible material which is secured to the top frame member 7 and depends therefrom.

Secured to the frame member 7 at each end thereof is an U-shaped supporting member, the supporting member at the rear of the bassinet when it is installed being indicated at 9 and that at the front end of the bassinet being indicated at 10.

Each supporting member is made with the two vertical arms 11 which are pivoted at their upper ends to the frame member 7, as shown at 12, the lower ends of the arms of each supporting member being connected by the cross bar or bridge portion 13. These supporting members provide means for supporting the bassinet when it is removed from the automobile. Said supporting members are held in their operative positions by means of folding braces 30, which provide for folding the supporting members when the bassinet is not to be used.

Each arm 11 of the rear supporting member 9 has a hooked member 14 pivoted thereto at its upper end, said hooked members being designed to hook over the top of the back 3 of the driver's seat, as shown in Fig. 1. These hook members 14 are preferably pivoted to the arms 11 so that they can be folded when the bassinet is not in use, and for this purpose the lower end of the stem of each hook member is rigidly mounted in a hinge member 15 which is made in the form of a loop that embraces the stem and is pivotally mounted on the upper end of the arm 11 by the same pivotal connection 12 by which said arm is pivotally connected to the frame member 7.

If desired, the hooks 14 may be so constructed that when they are hooked over the top of the back of the seat the bridge portion 13 of the rear supporting member 9 will rest lightly on the top of the seat 2.

Associated with the front U-shaped supporting member 10 are two extension legs 17, 18 which are adjustably secured to the arms of the supporting member 10, so that they may be adjusted to provide a firm support for the front end of the bassinet.

Automobiles are now commonly made with a raised floor portion extending longitudinally along the median line of the automobile body, such raised portion being for the purpose of accommodating the longitudinally extending driving shaft. In accordance with this invention, the means for supporting the front end of the bassinet is such that it can be firmly supported on portions of the floor at each of the two levels.

Figure 2:
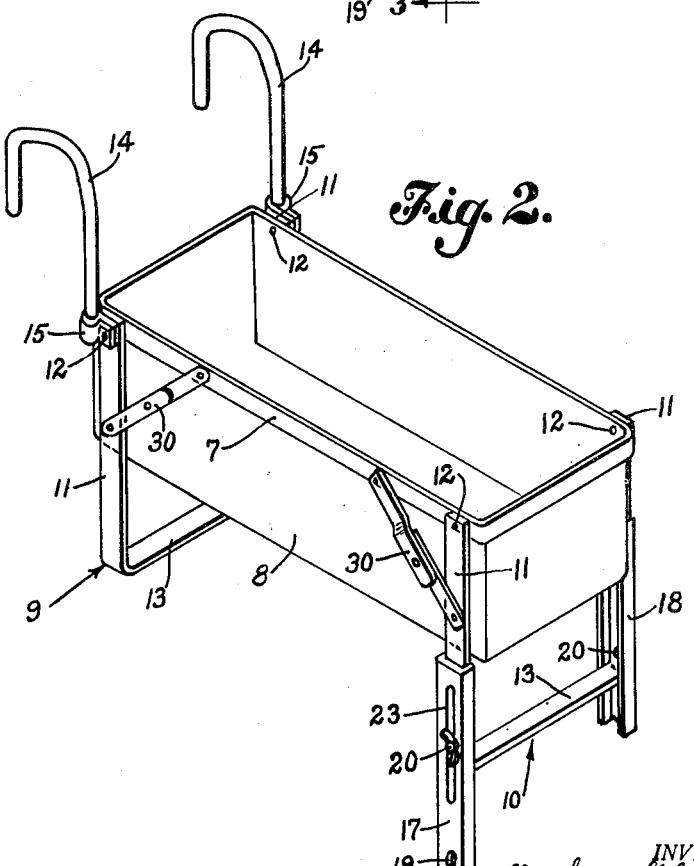
Fig. 2 is a perspective view of the bassinet.

Each extension leg is channel shaped, as shown in Fig. 4, and when in use it is located on the outside and embraces the corresponding arm 11 of the front supporting member 10, as shown in Fig. 2. Each extension leg member is formed with a longitudinally extending slot 23, and the lower end of each arm of the supporting member 10 is provided with an opening 24 near its lower end.

Each leg extension is clamped to the corresponding arm 11 by means of a clamping bolt 20 which extends through the slot 23 of the leg extension and also through the opening 24.

The leg extensions can be clamped firmly in adjusted position merely by tightening the clamp bolt, and when the bolt is loosened the leg extensions are free to be adjusted vertically on the arms 11 of the front supporting member.

If it is desired to install the bassinet in a position more or less close to the driver, then the outside leg extension 17 will be adjusted so that it will rest on a portion of the floor 4 at the lower level, and the other extension leg 18 will be adjusted so that it will rest on the portion 21 of the floor at the higher level, as shown in Fig. 3. In this way the front end of the bassinet will be firmly supported notwithstanding the fact that it is resting on portions of the floor at different levels.

The length of the extension legs 17, 18 is slightly less than the length of the arms 11. When the bassinet is not in use in the automobile, these leg extensions can be removed from the outside of the arms 11 and replaced for storage on inside of the arms, as shown in Fig. 6. Each leg extension has an opening 19 at its lower end and when the leg extensions are placed inside of the arms 11 they may be retained in such stored position by inserting the clamping bolt 20 through the holes 24 and 19 which are brought into alinement for this purpose. When the extension legs are thus stored on the inside of the arms 11 the bassinet will have two supporting members 9 and 10 of the same length which will support it in a level position when it is removed from the automobile.

I claim:

A bassinet for supporting a child above the driver's seat of an automobile and alongside of the driver, said bassinet comprising an elongated rigid top frame member having a length greater than the fore and aft dimensions of the driver's seat, a flexible body member secured to and depending from the top frame member, a one-piece U-shaped supporting member depending from the top frame member at each end thereof, both supporting members being of the same length and each supporting member extending transversely of the top frame member and having the upper ends of its arms secured thereto, a hook member pivotally secured to the upper end of each arm of the U-shaped supporting member at one end of the bassinet and adapted to hook over the top and back of the driver's seat when the bassinet is in operative position above said seat with the other end thereof located in front of the seat, each arm of the other supporting member having an opening closely adjacent its lower end, a channel-shaped extension leg for each arm of said other supporting member for extending the length thereof, each extension leg having a length less than that of the corresponding arm and also having a longitudinally extending slot in its upper portion and an opening closely adjacent its lower end, each extension leg being placeable on the outside of the corresponding arm with its slot registering with the opening in said arm for extending the effective length of said supporting member, a clamping bolt extending through the slot in each extension leg and the opening in the corresponding arm for clamping each leg in any adjusted position, each extension leg being removable from the outside of the corresponding arm and replaceable for storage on the inside thereof with the openings in said extension leg and arm in registering relation for the reception of said clamping bolt, thereby converting the bassinet into one with two supporting members of equal length.

ABRAHAM G. GOLDBERG.

REFERENCES CITED

The following references are of record in the file of this patent:

UNITED STATES PATENTS

| Number | Name | Date |
|---|---|---|
| 1,516,434 | Hoogner | Nov. 18, 1924 |
| 1,560,114 | Skog | Nov. 3, 1925 |
| 1,576,919 | Lowery | Mar. 16, 1926 |
| 2,488,225 | Mover | Nov. 15, 1949 |
| 2,508,822 | Goldberg | May 23, 1950 |
| 2,586,237 | Linden | Feb. 19, 1952 |